United States Patent Office 3,563,074
Patented Feb. 16, 1971

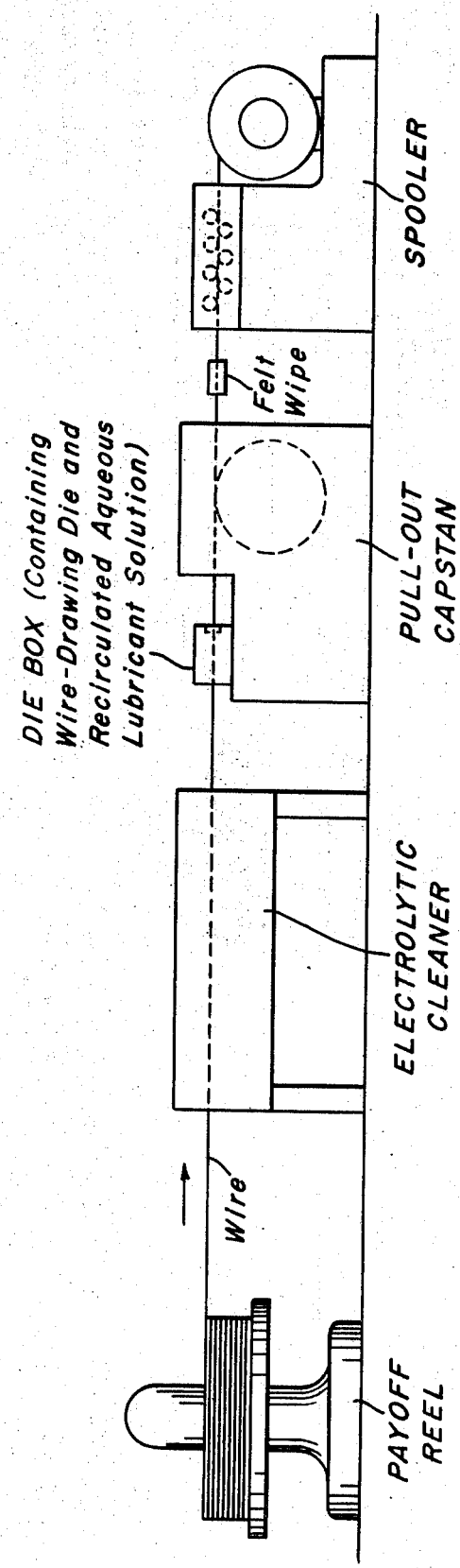

3,563,074
METHOD OF MAKING ELECTRIC WELDING WIRE HAVING EXTENDED SHELF LIFE
Samuel C. Avallone, Westlake, Ohio, assignor to United States Steel Corporation, a corporation of Delaware
Continuation-in-part of application Ser. No. 689,244, Dec. 7, 1967, which is a continuation-in-part of application Ser. No. 630,294, Apr. 12, 1967. This application Jan. 29, 1970, Ser. No. 6,929
Int. Cl. B21b 45/02
U.S. Cl. 72—39                                       6 Claims

ABSTRACT OF THE DISCLOSURE

A bright-finish weld-wire for electric welding purposes and the method of making such wire which includes cleaning a length of steel wire by acid-electrolytic treatment and then cold-drawing it through a diamond die using as a wire-drawing lubricant an aqueous solution of water-soluble soap and a water-soluble inorganic rust inhibitor.

---

This application is a continuation-in-part of application Ser. No. 689,244, filed Dec. 7, 1967, which in turn is a continuation-in-part of application Ser. No. 630,294, filed Apr. 12, 1967 both applications now abandoned.

The present invention relates generally to wire manufacture and more particularly to an improved bright-finish welding wire especially suitable for electric welding and a method of making such wire.

An essential to the optimum utilization of newly developed low-alloy constructional steels of high yield strength is an effective and compatible welding system. In order to weld such low-alloy steels, it is necessary that a high-grade, flawless filler-medium wire be used. Such wire must have a low hydrogen level and the ability to undergo storage for relatively long periods without losing its high quality. Research studies have established that these two factors can be controlled by using the wire-processing method of my invention which is effective to develop and maintain a bright, smooth finish on the welding wire and a minimal residual surface lubricant film thereon, and maintain the hydrogen content of the wire at the required low level. It is necessary to provide a pratically lubricant-free finish on the wire to prevent hydrogen pick-up which causes weld-metal cracking.

It is, accordingly, the primary object of my invention to provide smooth cold-drawn bright-finish welding wire, the surface of which has a minimum amount of wire-drawing lubricant remaining thereon but a sufficient film of an inhibiting agent to provide adequate corrosion resistance and, at the same time, be compatible with electric welding methods which are currently being used.

It is another object of my invention to provide an improved method for producing bright-finish welding wire especially suitable for electric welding purposes which comprises cleaning the wire electrolytically by passing it continuously through a sulfuric-acid electrolyte, alternating the polarity of the wire as it passes through the electrolyte, the final polarity of the wire being anodic before it emerges from the electrolyte; then cold-drawing the wire through diamond dies using an aqueous wire-drawing lubricant consisting of an aqueous solution of water-soluble soap and a water-soluble inorganic rust inhibitor.

These and other objects will become more apparent from the following description of my invention and the attached drawing in which:

The single figure is a diagrammatic illustration of a means and a combination of devices for carrying out the method of the invention.

The method used to produce the wire of the present invention relates specifically to the finishing phase of wire manufacture and finds advantageous utilization in the manufacture of substantially all high-strength filler metals for use in welding constructional alloy steels. One example of a plain carbon steel weld-wire composition suitable for this purpose is 0.11 C, 1.00 Mn, 0.27 Si, 0.024 S, 0.017 P, and the balance iron. A typical steel alloy weld-wire composition for this purpose is 0.08 C, 5.0 Ni, 0.50 Cr, 0.50 Mo, and the balance iron. Weld-wire of metal alloys other than steel can be advantageously treated by the method of the invention where it is desirable to maintain the hydrogen content of the wire at the lowest possible level. Examples of such other metal alloys are high nickel chrome alloys such as Nichrome having a typical composition of 80% Ni and 20% Cr. Another high nickel chrome alloy which can be advantageously treated by the method of the invention to produce low hydrogen content weld-wire is Inconel having a typical composition of 35% Ni, 18% Cr and 47% Fe.

In carrying out the method of the invention, the wire which has been previously cold-drawn to process size is cleaned by passing it through an acid electrolyte consisting of 15 to 25% sulfuric acid solution at 100 to 180° F. at a current density of 50 amperes per square inch and in close proximity to immersed lead electrodes. The polarity of the wire is alternated as it passes through the electrolyte. The final wire polarity is anodic to minimize surface hydrogen contamination.

After cleaning, the wire is reduced by a light draft (approximately 5 to 25% reduction) through a diamond wire-drawing die having an included entrance angle of approximately 25 to 40°. It has been found that optimum results are uniformly obtained reducing the wire approximately 15%. The use of a large entrance angle minimizes the amount of lubricant carried through the die with the wire and, therefore, minimizes the amount of residual lubricant on the wire after drawing. The diamond die, because of its high-hardness and the low-level of friction that it develops in drawing, requires a minimum of lubrication with the result that a clean, smooth finish is obtained after drawing. If desired, a conventional tungsten-carbide die could be used in the drawing operation. However, closer inspection of the finished product would have to be maintained if a tungsten-carbide die was used in place of the diamond since the former is lower in hardness and would require more frequent replacement due to wear.

An aqueous wire-drawing lubricant is used during the wire-drawing operation. This aqueous wire-drawing lubricant consists of an aqueous solution of a water-soluble soap and a water-soluble inorganic rust inhibitor. Sodium stearate, sodium oleate, sodium palmitate, potassium palmitate, sodium laurate, and potassium laurate have been found to be suitable water-soluble soaps for this purpose. Sodium chromate, potassium chromate, sodium dichromate, and potassium dichromate have been found to be effective for use as water-soluble inorganic rust inhibitors in the practice of the invention.

An example of a suitable aqueous wire-drawing lubricant composition is as follows:

0.75% sodium stearate by weight
0.75% sodium chromate by weight
98.50% water by weight Increasing the concentration of the water-soluble soap in the wire-drawing lubricant solution has not been found to be detrimental to the efficacy of the method of the invention nor has it been found to improve it to any appreciable extent. Acceptable results have been obtained using a solution having as low as 0.30% (by weight) of soap.

Other water-soluble soaps besides those mentioned above may be used so long as they provide satisfactory lubricity.

The percentage of water-soluble inorganic rust inhibitor may range from 0.30% to 1.50%. However, concentrations in excess of 0.75% are not economically feasible since they have not been found to appreciably enhance the corrosion-resistant quality of the wire.

The rust inhibitor added to the wire-drawing lubricant must be an inorganic material so that it does not become a source of hydrogen at the fusion point (at welding heat) in the welding operation. The rust inhibitor prolongs the shelf life of the welding wire.

The use of highly concentrated aqueous wire-drawing lubricant solutions should be avoided since the use of excess quantities of lubricant add to the surface contamination of the wire being drawn. The wire-drawing lubricant must be liquid so that it will flow out of the die and not adhere to the wire.

By practicing the method of the invention I have produced cold-drawn, bright-finish weld-wire having hydrogen contents consistently maintained below six parts per million, by weight, and above 0.50 parts per million, by weight.

If it is desired to produce weld-wire having the ultimate minimum hydrogen content, the wire-drawing step of the method of the invention may be carried out with two or more diamond dies arranged in tandem. The use of more than one die permits using lighter drafts to bring about the total desired reduction of approximately 5 to 25%. For example, in producing a weld-wire having a finished diameter size of .062 inch, a starting wire having a diameter of .067 inch may be used. This starting wire may be reduced to .064 inch diameter through one die and to .062 inch finished diameter size through a second die.

Although I have described but one embodiment of my invention, it will be apparent that other adaptations and modifications may be made without departing from the scope of the following claims.

I claim:

1. The method of making bright-finish weld-wire which comprises the steps of first supplying a length of plain carbon steel, or steel alloy or high nickel chrome alloy wire, then electrolytic-acid cleaning said wire making the final polarity of said wire anodic before it emerges from the electrolytic-acid cleaning step, then cold drawing said wire to obtain at least a 5% reduction using an aqueous wire-drawing lubricant consisting of aqueous solution of water-soluble soap and a water-soluble inorganic corrosion inhibitor.

2. The method as defined by claim 1 in which said metal wire is cold-drawn through at least one diamond wire-drawing die.

3. The method as defined by claim 1 in which the step of electrolytic-acid cleaning said metal wire includes passing the metal wire continuously through a sulfuric-acid electrolyte at a current density of substantially 50 amperes per square inch, and alternating the polarity of the metal wire as it passes through the electrolyte.

4. The method as defined by claim 1 in which the metal wire is reduced in the range of approximately 5 to 25% during the cold-drawing step.

5. The method as defined by claim 1 in which the aqueous wire-drawing lubricant solution consists of at least 0.30%, by weight, of one of the group consisting of sodium stearate, sodium oleate, sodium palmitate, potassium palmitate, sodium laurate, and potassium laurate; and approximately 0.30% to 1.50%, by weight, of one of the group consisting of sodium chromate, potassium chromate, sodium dichromate, and potassium dichromate; and the balance water.

6. The method as defined by claim 1 in which the aqueous wire-drawing lubricant solution consists of approximately 0.75%, by weight, of one of the group consisting of sodium stearate, sodium oleate, sodium palmitate, potassium palmitate, sodium laurate, and potassium laurate; and approximately 0.75% by weight of one of the group consisting of sodium chromate, potassium chromate, sodium dichromate, and potassium dichromate; and approximately 98.60%, by weight, of water.

References Cited

UNITED STATES PATENTS 6,929  8/1967  Stricker _____ 204—145

ROBERT K. MIHALEK, Primary Examiner

U.S. Cl. X.R.

204—145, 209